Nov. 22, 1966 G. E. GORKER 3,287,228
BOILING WATER NEUTRONIC REACTOR
Filed Sept. 28, 1965 2 Sheets-Sheet 1

INVENTOR.
George E. Gorker
BY
Roland A. Anderson
ATTORNEY.

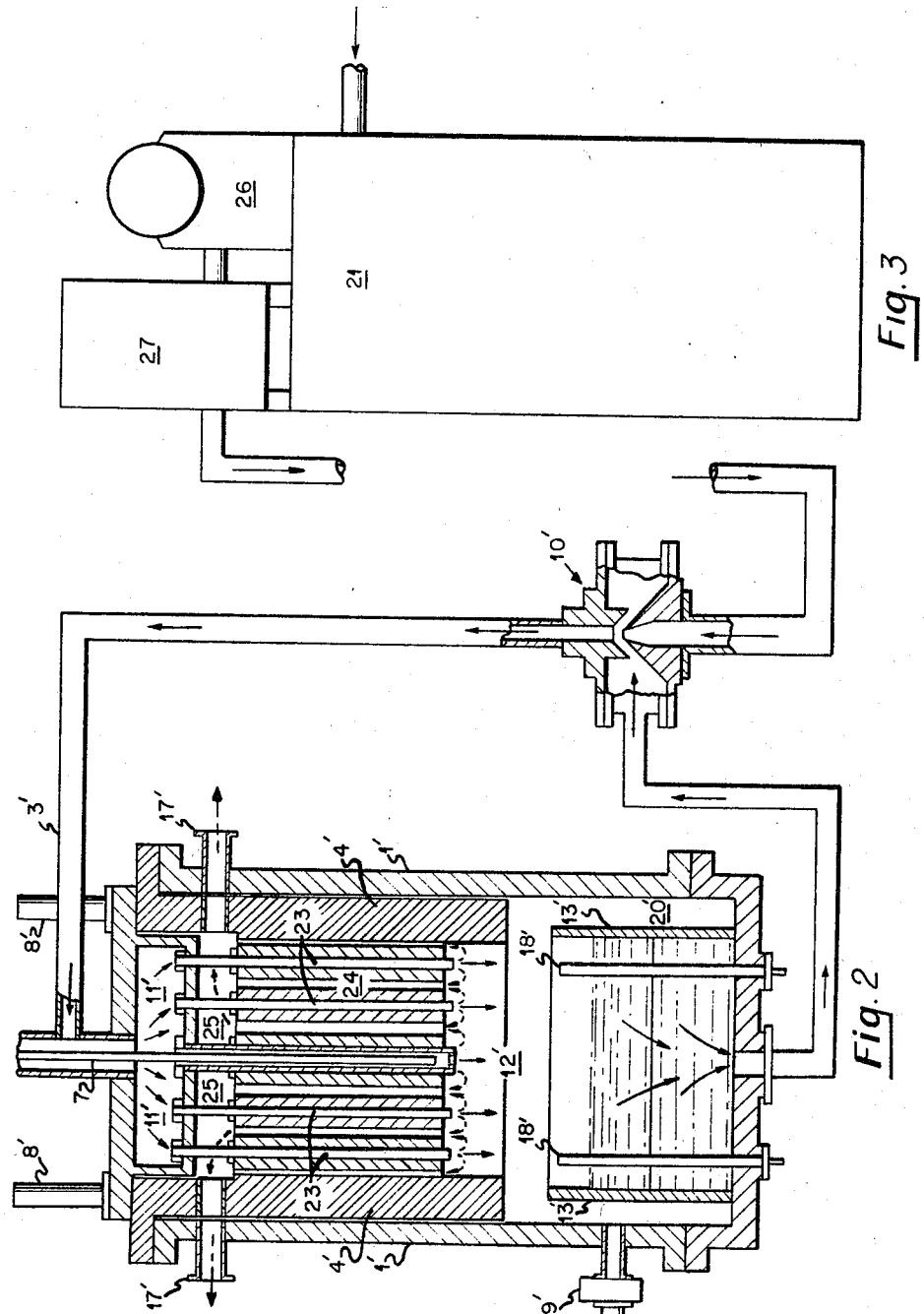

United States Patent Office 3,287,228
Patented Nov. 22, 1966

3,287,228
BOILING WATER NEUTRONIC REACTOR
George E. Gorker, Cincinnati, Ohio, assignor to the United States of America as represented by the United States Atomic Energy Commission
Filed Sept. 28, 1965, Ser. No. 491,064
4 Claims. (Cl. 176—54)

The invention described herein was made in the course of, or under, a contract with the U.S. Atomic Energy Commission. It relates generally to boiling water neutronic reactors, and more particularly to an improved system for steam separation and power control in a direct cycle boiling water neutronic reactor.

An inherent advantage of direct-cycle boiling water reactor systems is their relatively high thermodynamic efficiencies resulting from the elimination therein of intermediate heat exchangers as are found in both dual-cycle boiling water and pressurized water reactor systems. This advantage has been offset in part, however, by the general inability heretofore, of direct-cycle boiling water reactors to follow load or turbine demand. Decreases in reactor pressure due to increased turbine demand have resulted in increases in the steam void fraction in the reactor core with a corresponding decrease in reactivity, although an increase in reactivity is required to meet the increased demand.

Boiling water reactors which produce superheated steam have the additional control problem of maintaining the evaporator-superheater interface in its design location. This requirement arises because the evaporator is designed for high power density with water and wet steam cooling while the superheater is a gas-cooled region designed for low power density. A water flow which is too large for a given power level will in many cases force water and wet steam into the superheater and cause a large increase in the power generation therein due to the neutron moderating property of water. On the other hand, if the water flow is insufficient, dry steam may be produced in the high power density evaporator with resultant overheating therein as well as the development of excessive temperature gradients.

It is, accordingly, a general object of the invention to provide a load following, direct cycle, boiling water neutronic reactor.

Another object of the invention is to provide a boiling water neutronic reactor containing a nuclear fueled superheater wherein the evaporator-superheater interface is inherently stable.

Other objects of the invention will become apparent from an examination of the following description of the invention and the appended drawings, wherein:

FIG. 2 is a vertical sectional view of an alternate reactor embodiment incorporating an external jet pump to provide water circulation; and FIG. 3 is a schematic diagram of a feedwater supply system suitable for use with reactors made in accordance with this invention.

Figure 1:
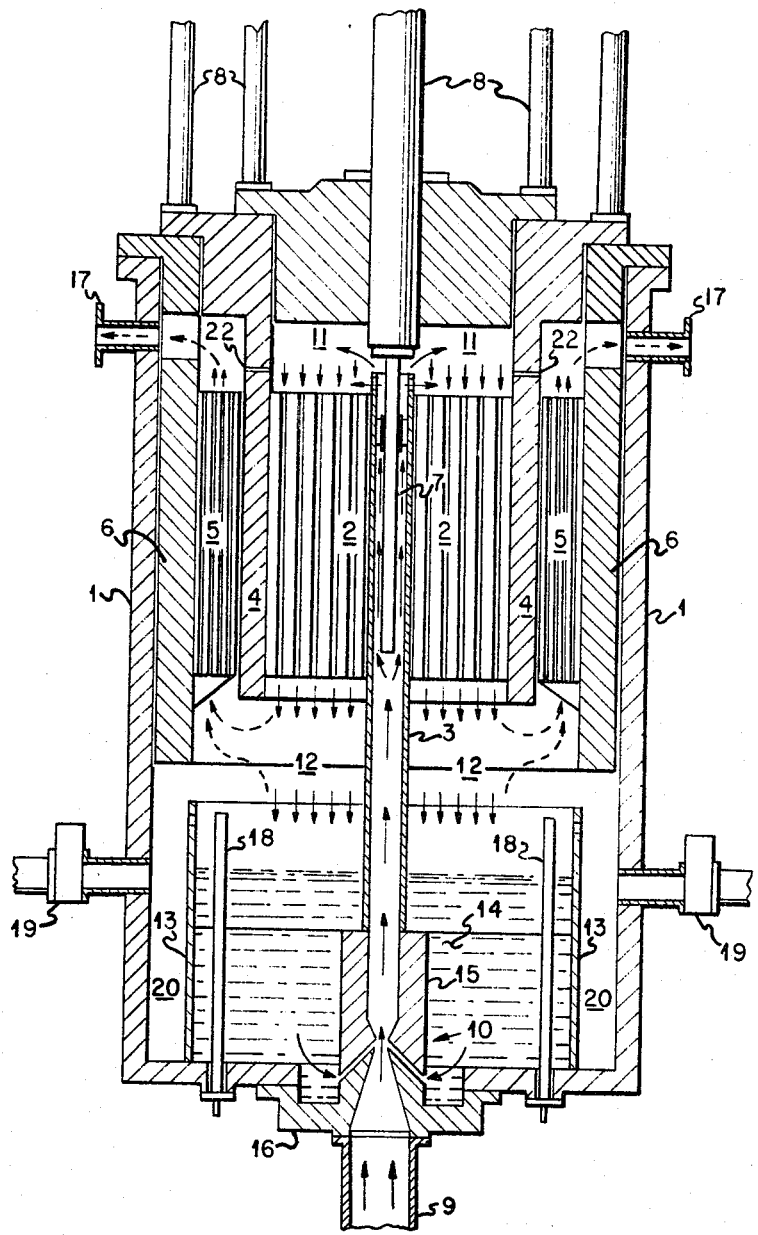
FIG. 1 is a vertical sectional view of a boiling water neutronic reactor utilizing a steam separation and power control system in accordance with this invention.

In accordance with this invention, a class of boiling water neutronic reactors is provided in which the water boils as it travels downward through the reactor active core region to a lower plenum where the unevaporated water and generated steam separate. The separated steam flows upward through a superheater and then to a steam turbine. The unevaporated water passes into a water collection basin before being added to fresh feedwater and recirculated through the core. The water level in the water collection basin is maintained within preselected limits by adjusting the power level of the reactor core so as to balance the fresh feedwater mass flow rate with the steam generation rate in the core. The feedwater flow rate is made dependent upon the turbine steam demand.

In order to facilitate an understanding of the invention, reference is first made to FIG. 1 wherein a boiling water reactor system incorporating a steam separation and power control scheme in accordance with this invention is illustrated. A pressure vessel 1 contains a nuclear fueled evaporator core portion 2 which surrounds a central water inlet pipe 3. Surrounding evaporator core portion 2 is a neutron reflector 4 which supports the evaporator, and a nuclear fueled superheater core portion 5. An outer neutron reflector 6 surrounds the entire core assembly and provides support to superheater core portion 5. Neutron absorbing control elements 7 (only one shown) are disposed in the control water inlet pipe 3 and in reflectors 4 and 6. The control elements are positioned by actuators 8.

Pressurized feedwater returning from the main feedwater pump enters inlet port 9 and then passes upward through recirculating jet pump 10 and central inlet water pipe 3 into water distribution plenum 11 above the evaporator core portion 2. It then passes down through the evaporator core portion where it is greatly heated. A fraction of the water flowing downward through the evaporator is boiled so that a mixture of steam and water discharges from the bottom of the evaporator into the steam separation plenum 12. The unevaporated water continues downward into water collection basin 13 while the steam separates and passes upward through the superheater core portion 5. Alternatively, the steam-water mixture may discharge downward from evaporator 2 with sufficient momentum so that a portion of the steam also passes into water collection basin 13 before separating from the water and raising upward to superheater core portion 5. The unevaporated water in collection basin 13 passes down through support ribs and baffle 14 to the inlet of recirculating jet pump 10 where it mixes with incomnig feedwater and passes upwardly through water inlet pipe 3. Baffle 14 prevents entrained steam from reaching jet pump 10 where it could cause excessive erosion through cavitation effects. A recirculating loop of water is thus maintained through the evaporator core portion 2, with incoming feedwater from the steam turbine condenser providing the driving force for the circulation and supplying makeup water to replace that lost from the loop through steam generation.

The jet pump 10 comprises two major units 15 and 16. The upper unit 15, which supports central water inlet pipe 3 and which is supported in turn by ribs 14 in water collection basin 13, forms part of the nozzle and all of the diffuser. Alternatively, jet pump 10 may be located external to pressure vessel 1 as illustrated in FIG. 2.

Measurement of the water level in water collection basin 13 facilitates reactor power adjustment so that the steam flow through steam exit ports 17 equals the feedwater flow entering inlet port 9. When these two flows differ, the water level in water collection basin 13 changes accordingly. Transducers 18 generate a signal (electrical, hydraulic or pneumatic) proportional to the water level in collection basin 13. When the water level reaches a preselected upper or lower limit, the reactor power is adjusted to match the turbine demand and maintain the water level within the limits. For example, if the turbine demand exceeds the reactor power output, the mass flow rate of the feedwater returning to the reactor will be greater than the mass flow rate of the steam generated in and leaving the reactor. As a result of the discrepancy in flow rates, the water level in water collection basin 13 will rise and pass the preselected upper limit described above. When this happens, the reactor power and corresponding steam generation rate is automatically increased through suitable manipulation of control elements 7 until the water level in collection basin 13 is brought within the preselected limits and the reactor power matches the turbine demand. Conversely, if the turbine demand is less than the reactor output, the water in collection basin 13 decreases and the reactor power is decreased to match the turbine demand. The system for increasing feedwater flow to the reactor with increased turbine demand will be described in a later reference to FIG. 3.

Bypass valve 19, which is connected to overflow compartment 20, is opened during reactor startup and shutdown. During startup, feedwater is pumped into the pressure vessel until the water in the collection basin reaches a preselected level, and the reactor is made critical at low power. The reactor power is increased slowly for safety reasons, and the feedwater flow rate may exceed the steam generator rate by a significant margin at this point. Bypass valve 19 prevents the water level from rising and flooding the entire pressure vessel under these conditions by returning water which overflows from collection basin 13 into overflow compartment 20, to the feedwater pump sump 21 as shown in FIG. 3. After the reactor has been brought to a power level where the water level in collection basin 13 is reduced to its predetermined proper level, the reactor startup is complete and by-pass valve 19 is closed. During a shutdown the bypass valve is opened and water continues to flow through the evaporator for aftercooling. A water spray 22 is provided to cool superheater core portion 5 during shutdown. Spray 22 would be normally closed during operation of the reactor at power although it could be used to regulate the steam exhaust temperature from the superheater.

Alternatively, the superheater core portion 5 could be replaced by a steam cooled neutron reflector which would heat the steam although providing little or no superheat. Water spray 22 could be eliminated in such a case as no aftercooling would be necessary for the reflector.

FIG. 2 illustrates another reactor embodiment which uses the same basic water circulation system as the reactor of FIG. 1. In this embodiment the recirculating jet pump 10′ is located outside of the pressure vessel. Each fuel element 23 in core 24 incorporates evaporator and superheating portions. The evaporator portion is in the central fuel element region where the greatest power generation occurs. In the outer, lower power region of each fuel element the steam is superheated. Initially, the water passes down through the central, high power region of each fuel element where a portion of the water is boiled or evaporated. The resulting water-steam mixture is ejected downward into steam separation plenum 12′ where the water separates from the steam and passes into water collection basin 13′. The steam rises and re-enters the fuel elements, flowing upward through their outer superheating portions where it is superheated. From the superheated steam exhaust plenum 25 at the top of the active core region, the steam passes through insulated ducts to the steam turbines. The unevaporated water which passes into collection basin 13′ is recirculated by jet pump 10′ in the same manner as described in reference to the reactor system of FIG. 1.

A feedwater system suitable for use with the reactor systems of this invention is schematically illustrated in FIG. 3. A main feedwater pump 26 supplies a surge tank 27 of limited volume. The surge tank 27 ensures a feedwater flow rate to the reactor which varies in proportion to the steam load at the turbines. An increase in the steam load at the turbine acts to decrease the reactor pressure and cause an increase in feedwater flow from surge tank 27 which is maintained at essentially constant pressure. The increase in feedwater flow raises the water level in water collection basin 13. The increased water level is measured by transducers 18 which provide a signal to the reactor control system so that the reactor power level may be adjusted to match the turbine load. After the reactor power is adjusted and the water level is returned within the preselected limits described above, the reactor remains at the new power level until the feedwater flow rate is again changed by a change in turbine load.

The above embodiments of boiling water reactor systems are highly schematic and not intended to represent final detailed designs. The size and spacing of individual reactor components are not shown in exact proportion, nor are they shown in detail. It will be recognized by those skilled in the neutronic reactor art, however, that virtually any fuel element configuration which could be used in other, well-known boiling water reactors already in existence, could also be used with the present invention.

What is claimed is:

1. A boiling water neutronic reactor comprising a nuclear-fueled evaporator core, a water inlet plenum chamber above said evaporator core, a steam separation plenum chamber below said evaporator core, water from said inlet plenum chamber passing downwardly through said evaporator core and discharging as a mixture of steam and water into said steam separation plenum chamber, a water collection basin disposed below said steam separation plenum chamber for collecting unevaporated water passing through said steam separation plenum chamber, means for determining the water level in said water collection basin, and means for returning water from said water collection basin to said water inlet plenum chamber.

2. The reactor of claim 1 wherein said means for returning water from said water collection basin to said water inlet plenum chamber comprises a feedwater driven jet pump.

3. The reactor of claim 1 wherein said means for determining the water level in said water collection basin comprises at least one signal generating transducer.

4. A boiling water neutronic reactor comprising nuclear fueled evaporator and superheater core portions, a water inlet plenum chamber above said evaporator core, a steam separation plenum chamber below said evaporator core, water from said inlet plenum chamber passing downwardly through said evaporator core portion and discharging therefrom into said steam separation plenum chamber as a mixture of steam and water, said steam separating from said mixture and then passing upwardly through said superheater core portion, a water collection basin disposed below said steam separation plenum chamber for collecting unevaporated water discharged from said evaporator core portion and passing downwardly through said steam separator plenum chamber, signal producing means for determining the water level in said water collection basin, and means for returning water from said water collection basin to said water inlet plenum chamber.

References Cited by the Examiner

UNITED STATES PATENTS

| | | | |
|---|---|---|---|
| 2,861,033 | 11/1958 | Treshow | 176—56 |
| 2,990,348 | 6/1961 | Wollan | 176—54 |
| 3,087,881 | 4/1963 | Treshow | 176—54 |
| 3,202,584 | 8/1965 | Bogaardt et al. | 176—61 |
| 3,228,846 | 1/1966 | Bryan | 176—54 |

L. DEWAYNE RUTLEDGE, *Primary Examiner.*